United States Patent [19]

Golden et al.

[11] Patent Number: 5,135,548
[45] Date of Patent: Aug. 4, 1992

[54] OXYGEN SELECTIVE DESICCANTS

[75] Inventors: Timothy C. Golden; Paula J. Battavio, both of Allentown; Yee-Chang Chen, Macungie; Thomas S. Farris, Bethlehem; John N. Armor, Orefield, all of Pa.

[73] Assignee: Air Products and Chemicals, Inc., Allentown, Pa.

[21] Appl. No.: 697,053

[22] Filed: May 8, 1991

[51] Int. Cl.⁵ .............................................. B01D 53/04
[52] U.S. Cl. ........................................... 55/25; 55/28; 55/31; 55/33; 55/58; 55/62; 55/68; 55/75; 55/389; 502/417
[58] Field of Search ................... 55/31, 33, 35, 68, 75, 55/388, 389, 25, 28, 58, 62, 74, 387; 502/184, 417

[56] References Cited

U.S. PATENT DOCUMENTS

| | | |
|---|---|---|
| 3,116,131 | 12/1963 | Beerman .............................. 55/33 X |
| 3,960,522 | 6/1976 | Munzner et al. ..................... 55/75 X |
| 4,013,429 | 3/1977 | Sircar et al. ............................. 55/33 |
| 4,256,773 | 3/1981 | Itoga et al. ........................... 55/75 X |
| 4,261,709 | 4/1981 | Itoga et al. ........................... 55/75 X |
| 4,376,639 | 3/1983 | Vo ....................................... 55/75 X |
| 4,376,640 | 3/1983 | Vo ....................................... 55/75 X |
| 4,439,213 | 3/1984 | Frey et al. ............................ 55/33 X |
| 4,576,614 | 3/1986 | Armond et al. ..................... 55/31 X |
| 4,742,040 | 5/1988 | Ohsaki et al. ................... 502/417 X |
| 4,925,461 | 5/1990 | Gemba et al. ....................... 55/75 X |
| 4,992,410 | 2/1991 | Cullen et al. ................... 502/417 X |

FOREIGN PATENT DOCUMENTS

| | | | |
|---|---|---|---|
| 55-051436 | 4/1980 | Japan ................................. 502/417 |
| 59-228935 | 12/1984 | Japan ................................. 502/417 |
| 483993 | 12/1975 | U.S.S.R. ................................ 55/75 |
| 490488 | 2/1976 | U.S.S.R. ................................ 55/75 |
| 778756 | 11/1980 | U.S.S.R. ................................ 55/33 |
| 573880 | 12/1945 | United Kingdom ................... 55/33 |

Primary Examiner—Robert Spitzer
Attorney, Agent, or Firm—Geoffrey L. Chase; James C. Simmons; William F. Marsh

[57] ABSTRACT

Composite oxygen selective desiccants comprising a carbon molecular sieve which is kinetically selective for the adsorption of oxygen over nitrogen and an agent for the sorption of water such as lithium chloride, lithium bromide, calcium chloride, magnesium chloride, calcium nitrate, potassium fluoride, oxides of silicon, aluminum, calcium or barium are disclosed. Methods of making the components and their use in air separation are also set forth.

30 Claims, 9 Drawing Sheets

OXYGEN SELECTIVE DESICCANTS

TECHNICAL FIELD

The present invention is directed to compositions and processes for using compositions that have desiccant and oxygen-selective capabilities. More specifically, the present invention is directed to carbon molecular sieves having desiccant and carbon dioxide adsorptive properties for use in the adsorption of oxygen from air to produce a nitrogen enriched product.

BACKGROUND OF THE PRIOR ART

The production of nitrogen from air and other nitrogen and oxygen containing gas mixtures can be performed in a number of industrially suitable techniques including cryogenic distillation, membrane permeation and adsorption, using pressure swing adsorption or temperature swing adsorption techniques. Recent mid-range volume requirements for nitrogen for industrial end uses and other end uses have been successfully met by the use of pressure swing adsorption techniques. Competition to provide pressure swing adsorption systems having the simplest equipment arrangement, the smallest size and the least cost in both procurement and operation has been experienced in the industrial gas industry directed to nitrogen products.

However, the nitrogen producing industrial gas industry is still beset with the problem of producing dry, nitrogen-enriched product from effectively wet and carbon dioxide-containing feed gases, such as ambient air.

The presence of water in air has a negative effect on the performance of air separation adsorbents. The water reduces both gas uptake rates and capacities which serve to lower the production capability of the adsorbent. Water can also cause oxidation of carbon molecular sieves which further reduces gas uptake rates. Given the negative impact of water, two techniques are currently used to remove moisture prior to the air separation adsorbent. These techniques include (1) water removal by chilling and condensing or (2) gas drying with conventional desiccants.

Water can be effectively removed from gas streams by cooling the stream, condensing out the water and heating the stream back up to reduce its relative humidity. This technique reduces the relative humidity of the inlet air stream which minimizes the deleterious effects of water on adsorbent performance. Typically, this procedure is carried out by passing the air through a refrigerant chiller which reduces the gas temperature and condenses much of the inlet moisture. The resultant low relative humidity air (after gas heat-up) is then sent directly to the adsorptive separation.

The shortcomings of this technique of water removal are fairly evident. Firstly, the chiller adds a piece of equipment to the process design and as such increases the plant capital cost. In addition, the presence of the chiller increases the energy usage of the system and thereby increases power costs. Finally, refrigerant chillers tend to be high maintenance items and will lead to system downtime.

Conventional desiccants include inorganic species like zeolites, aluminas and silica gels. These materials are used as desiccants because they have high water adsorption capacities and favorable water adsorption isotherm shapes. The water adsorption capacity of these materials varies from 20 to 50 wt %. This high capacity limits the adsorbent requirement for drying. These materials also have water adsorption isotherms that are concave to the pressure axis, particularly at low pressure, which helps in forming short, sharp mass transfer zones. Thus, conventional desiccants have water adsorption properties which minimize the amount of adsorbent needed to dry gas streams.

However, these conventional desiccants are all polar materials. Because these conventional desiccants are polar, they selectively adsorb polar molecules like water. With respect to the major components of air, these adsorbents, particularly the zeolites, show selective adsorption of nitrogen over oxygen due to the more polar nature of nitrogen. This is a clearly undesired situation with respect to nitrogen production by pressure swing adsorption ($N_2$ PSA). Thus, for $N_2$ PSA applications conventional, polar desiccants have the undesired property of $N_2$ selective adsorption. The use of conventional desiccants (alumina) is the technique currently employed in many $N_2$ PSA processes.

Thus, both previous solutions to the problem of water removal for nitrogen pressure swing adsorption processes based on oxygen selective adsorbents have shortcomings. Conventional desiccants display nitrogen selective adsorption, which is undesirable. Even in cases where the nitrogen selectivity is minimal, conventional desiccants will act as unselective sections in the nitrogen pressure swing adsorption beds thereby lowering nitrogen recovery and productivity. Water removal with refrigerant chillers has the drawbacks of increasing both capital and power costs as well as adding high maintenance equipment to the installation.

U.S. Pat. No. 3,923,477 discloses a pressure swing adsorption system having drying beds that precede the beds which selectively extract oxygen from air to produce a nitrogen-enriched product. At column 2, lines 8 through 10 the patent mentions that separate beds are unnecessary when recovering a nitrogen product from air.

Such compound adsorption beds containing a desiccant layer and a main adsorbent layer selected for the primary separation are illustrated in U.S. Pat. No. 4,326,858.

More specifically, in British Patent 2,042,365 adsorption beds having a desiccant layer followed by carbon molecular sieve for the selective adsorption of oxygen preferentially over nitrogen in an air separation process resulting in nitrogen enriched product is described. The desiccant is identified as alumina or silica gel.

Russian Patent 1,219,122 discloses a composition for drying gases using adsorption technology in which the composition includes activated aluminum oxide, activated carbon, a binder and a hygroscopic additive of lithium bromide. The only recited utility of the composition is as a sorbent of moisture intended for the drying of gas-air media.

U.S. Pat. No. 4,677,096 discloses activated carbon which is impregnated with various agents selective for diverse gases generally considered to be toxic to human breathing, other than moisture.

U.S. Pat. No. 4,708,853 discloses carbon molecular sieves which are impregnated with various agents which are selective to the adsorption of mercury from gas streams.

U.S. Pat. No. 4,402,717 discloses a dehumidifying and deodorizing system which impregnates activated carbon on a paper substrate and further impregnates the activated carbon with desiccants such as lithium bromide, lithium chloride, potassium chloride, etc.

U.S. Pat. No. 4,702,749 discloses the treatment of activated carbons in an oxidizing acid wash to introduce surface oxide groups which makes the carbon relatively more hydrophylic. These activated carbons are then used in adsorptive drying.

The literature article, Activated Carbon Adsorbent For PSA Driers, T. C. Golden, et al., Carbon, Vol. 28, No. 5, pp. 683–690 discloses a process for oxidizing the surface of activated carbon to render it hydrophylic for water adsorption.

Therefore, the problem facing the industrial gas industry is the more effective removal of water from ambient air and thereby the enhancement of the performance of a nitrogen-enriched gas generating pressure swing adsorption process. This requires a desiccant material that demonstrates oxygen selective adsorption. There are current desiccant materials that display nitrogen selective adsorption such as zeolites, however oxygen selective desiccants are not known and prior to the present invention this problem remained unsolved.

The prior art although implementing desiccants as pretreatments in pressure swing adsorption systems, has failed to provide an appropriate advantage in simplified, compact systems for the production of nitrogen-enriched gas products in an efficient manner. The present invention overcomes the drawback of the prior art, as set forth below.

BRIEF SUMMARY OF THE INVENTION

The present invention is a composite oxygen selective desiccant comprising a carbon molecular sieve which is kinetically selective for the adsorption of oxygen over nitrogen and an agent for sorption of water which does not substantially impair the selectivity of the sieve.

Preferably, the agent is selected from the group consisting of lithium chloride, lithium bromide, calcium chloride, magnesium chloride, calcium nitrate, potassium fluoride, oxides of silicon, aluminium, calcium, and barium and mixtures thereof.

Preferably, the agent is present in the meso- and macropores of the carbon molecular sieve.

Preferably, the agent is lithium chloride.

Preferably, the carbon molecular sieve is a product of a material selected from the group consisting of chars derived from coconut shells, organic polymers, coal, peach pits, cherry pits, babassu nutshells and mixtures thereof.

Preferably, the agent is impregnated on the carbon molecular sieve in a liquid media using the incipient wetness technique.

More specifically, the present invention is a composite oxygen and carbon dioxide selective desiccant comprising a carbon molecular sieve having meso- and/or macropores predominantly in the size range of approximately 2–50 nanometers and greater than 50 nanometers respectively and micropores predominantly in the size below approximately 0.4 nanometers and a desiccant agent, impregnated substantially in the meso- and macropore of the sieve, selected from the group consisting of lithium chloride, lithium bromide, calcium chloride, magnesium chloride, calcium nitrate, potassium fluoride, oxides of silicon, aluminum, calcium and barium and mixtures thereof.

The present invention is also a process for making an oxygen selective desiccant comprising impregnating carbon molecular sieve with a solution or suspension of an agent or its precursor for the sorption of water using the incipient wetness technique and drying the resulting composite desiccant.

Preferably, the agent is selected from the group consisting of lithium chloride, lithium bromide, calcium chloride, magnesium chloride, calcium nitrate, potassium fluoride, oxides of silicon, aliuminum, calcium and barium and mixtures thereof.

Alternatively, the precursor of the agent is impregnated on the carbon molecular sieve and the composite is heated at elevated temperature to decompose the precursor to the agent for sorption of water.

Preferably, the precursor is selected from the group consisting of cations of silicon, aluminum, calcium and barium with anions of nitrates, acetates, formates, or hydroxides.

Alternatively, the precursor is selected from the group consisting of silica containing sols or gels.

Alternatively, the present invention is a process of making an oxygen selective desiccant comprising oxidizing a carbon molecular sieve which is kinetically selective for the adsorption of oxygen over nitrogen in the presence of an oxidizing agent to produce oxygen functional groups which are selective to water.

Preferably, the oxidation is conducted in the gas phase with an oxidizing agent selected from the group consisting of oxygen, nitrogen dioxide and ozone.

Alternatively, the oxidation is conducted in the liquid phase with an oxidizing agent selected from the group consisting of nitric acid and hydrogen peroxide.

The present invention is also directed to a process of adsorptive separation of nitrogen from oxygen using an adsorbent kinetically selective for the adsorption of oxygen over nitrogen in which at least an initial portion of the adsorbent is a composite oxygen and carbon dioxide selective desiccant comprising a carbon molecular sieve which is kinetically selective for the adsorption of oxygen over nitrogen and an agent for the sorption of water.

Preferably all of the adsorbent is a carbon molecular sieve.

Preferably the separation is a pressure swing process.

Alternatively, the separation is a vacuum swing process. Further alternatively, the separation is a temperature swing process.

Preferably, the process is a pressure swing separation performed in a plurality of zones of adsorbent in which in each zone is conducted a series of steps comprising; adsorption at elevated pressure, pressure equalization between zones, desorption of the zone finishing adsorption, pressure equalization between zones, repressurization of the zone finishing desorption.

Preferably after the desorption step, a low pressure rinse of nitrogen is performed on the zone finishing desorption.

Preferably, the process uses a desiccant wherein the agent is selected from the group consisting of lithium chloride, lithium bromide, calcium chloride, magnesium chloride, calcium nitrate, potassium fluoride, oxides of silicon, aluminum, calcium and barium and mixtures thereof.

Preferably, the process uses a desiccant wherein the agent is present in the meso- and macropores of the carbon molecular sieve and does not substantially impair the selectivity of the sieve.

Preferably, the process uses a desiccant in which the agent is lithium chloride.

Preferably, the process uses a desiccant in which the agent is a sol of an oxide of silicon.

Alternatively, the present invention is a process of adsorptive separation of nitrogen from oxygen using an adsorbent kinetically selective to the adsorption of oxygen over nitrogen in which an at least initial portion of the adsorbent is a composite oxygen selective desiccant comprising a carbon molecular sieve which is kinetically selective for the adsorption of oxygen over nitrogen and contains oxygen functional groups which are hydrophylic.

DETAILED DESCRIPTION OF THE INVENTION

Figure 1:
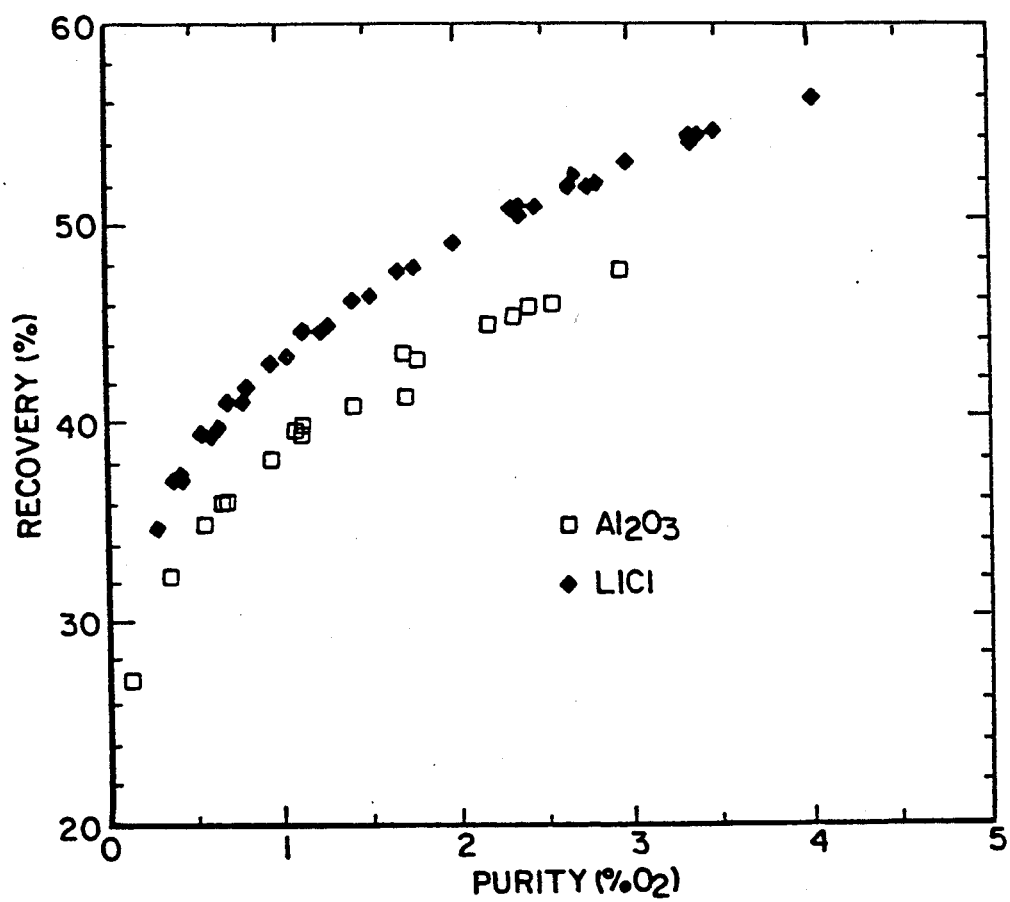
FIG. 1 is a graph of air recoveries versus partial pressure of oxygen impurity in the product nitrogen (purity) using the process of the present invention (LiCl) in comparison to the prior art ($Al_2O_3$) where a desiccant is loaded in the upstream portion of an oxygen selective adsorbent bed at 70° F.

Water removal from ambient air is an important first step in the production of nitrogen enriched gas from gas mixtures containing nitrogen, such as air. This is true for essentially all of the gas separatory processes including cryogenics, membrane permeation and adsorption. For the production of nitrogen from a pressure swing adsorption process, water removal and its efficient implementation are significant to the economics of that separatory process, particularly in regard to its use versus the competing separatory processes. Water has a deliterious effect on the performance of the carbon molecular sieves used to selectively adsorb oxygen in comparison to nitrogen in a nitrogen-enriched product generating pressure swing adsorption process. Water adsorbed in the micropores of the carbon reduces its adsorption capacity and water adsorbed near pore constrictions reduces the rate of gas diffusion, both of which are detrimental to a kinetically-driven adsorptive air separation to produce a nitrogen-enriched product.

In the current state of the art nitrogen-producing pressure swing adsorption process, water is removed by an alumina adsorbent that is located upstream of the main adsorbent for selective oxygen adsorption over nitrogen, comprising carbon molecular sieve, of the nitrogen-generating pressure swing adsorption process. The pretreatment alumina adsorbent adsorbs water, but does not enter into the adsorptive air separation itself. Thus, the alumina adsorbent section of the adsorbing bed which constitutes 10–20% of the total bed volume of the state-of-the-art pressure swing adsorption system for the production of nitrogen is basically empty void with respect to the actual adsorptive separation of air. An adsorbent which can both adsorb water and separate oxygen and nitrogen simultaneously will improve the performance of the nitrogen-enriched gas generating pressure swing adsorption process and is the significant result of the present invention.

The present invention therefore describes compositions, their synthesis and methods for the use of dual function adsorbents having desiccant properties which also display adsorptive selectivity for oxygen and carbon dioxide over nitrogen. In general, this is achieved by enhancing the water adsorption properties of oxygen selective adsorbents. More specifically, the production of oxygen selective desiccants is accomplished by impregnation of carbon molecular sieves with certain hygroscopic salts or inorganic oxides in the meso- and macropore system of the carbon. The advantage of these adsorbent materials over conventional pressure swing adsorption desiccants for nitrogen-enriched gas generating pressure swing adsorption applications are improvements in nitrogen productivity and air recovery, both of which are measures of the capability of a nitrogen generating adsorptive separation.

The previous solutions for pressure swing adsorption water removal from air streams included the use of conventional pressure swing adsorption water adsorbents like alumina and cooling inlet feed air streams to the point of condensing contained water out of the stream. Both of these prior solutions are inefficient in that the first prior art concept requires space and materials which do not perform a nitrogen generating function and the latter is equipment intensive with power requirements. In contrast, the dual function adsorbents of the present invention when used in place of the recited conventional desiccants improve the air recovery and nitrogen productivity of a nitrogen-enriched product generated from a pressure swing adsorption process.

These advantages exist because the bimodal pore distribution of the supports and the production technique allow water adsorption in the meso- and macropores and oxygen adsorption in the micropores of the carbon molecular sieve material used in the underlying processes of the present invention.

The present invention will now be described in greater detail with regard to the technique for enhancing the water adsorption properties of oxygen selective adsorbents to produce an oxygen selective desiccant.

Enhancing the water adsorption properties of an adsorbent which is chosen for its oxygen selectivity over nitrogen to render it suitable for pressure swing adsorption drying utility entails increasing its water adsorption capacity and changing its water adsorption isotherm. This provides high capacity for adsorption at essentially lower partial pressures of water in the feed gas to be treated in contrast to the known water adsorption isotherm of oxygen selective adsorbents, such as carbon molecular sieves, where the adsorption capacity is relatively low and changes gradually at essentially lower partial pressures of water in the feed gas to be treated. This distinction is a change in the characteristic isotherm shapes as set forth in the Brunauer classification (S. J. Gregg and K. S. W. Sing, *Adsorption, Surface Area and Porosity*, Academic Press, New York [1982]) wherein carbon molecular sieve has a type III isotherm shape, generally concave in shape, and the impregnation of select agents as desiccants per the present invention alters this isotherm of carbon molecular sieve to a modified type I shape, generally convex in shape. Increasing the water adsorption capacity of oxygen selective adsorbents reduces the adsorbent inventory needed to remove a given amount of water from a feed gas stream to be treated. Changing the water adsorption isotherm shape to a modified type I shape produces a preferred pressure swing adsorption desiccant with both a short mass transfer zone on adsorption and a fascile desorption when purging with dry regeneration gas. Differing techniques to enhance the water adsorption properties of oxygen selective adsorbents and results displaying their utility are set forth below.

The techniques of the present invention are preferably practiced on carbon molecular sieves. Carbon molecular sieves differ from other forms of carbon, such as activated carbon, in that they are kinetically oxygen selective in the presence of oxygen and nitrogen. This means that oxygen molecules are more readily adsorbed than nitrogen molecules when a separatory process is performed in a kinetic fashion wherein the speed of the oxygen molecule being adsorbed is used to advantage, rather than allowing the adsorption of oxygen and nitrogen molecules to reach an equilibrium over the passage of time. This kinetic selectivity that is unique to carbon molecular sieves in the carbon materials family is based upon the faster and more ready passage of oxygen into micropores of select size range existing in carbon molecular sieves in contrast to the similar passage and adsorption of larger nitrogen molecules. This kinetic selective differential and pore size is engineered into carbon molecular sieves typically by altering pore sizes with additives to a basic carbon to occlude existing micropore structure to the appropriate dimension, resulting in a differential in the kinetic adsorption of oxygen in contrast to nitrogen. This production of carbon molecular sieves from untreated carbon is well known in the prior art and is practiced by the German company Bergwerksverband GmbH as exemplified in U.S. Pat. No. 3,960,522 which is hereby incorporated in its entirety by reference. In such a technique, a material such as benzene is impregnated onto a carbon substrate and is pyrolyzed at elevated temperature, resulting in carbon deposition in the micropore structure of the starting carbon materials producing micropore dimensions that are all essentially within a range sufficient to kinetically adsorb oxygen over nitrogen selectively. Carbon molecular sieves are porous substrates with an open-network structure of controlled molecular dimension which may be used to separate mixtures of small molecules from larger molecules, based on a difference in molecular size or a difference in diffusivity rates. They can contain macropores of approximately greater than 50 nanometers, mesopores of approximately 2 to 50 nanometers and micropores of approximately under 0.4 nanometers. U.S. Pat. No. 3,884,830, which is hereby incorporated by reference, describes the manufacture of an activated carbon molecular sieve. Carbon molecular sieves have been prepared from a variety of substrates by a number of different manufacturing processes. Examples include anthracite coal (U.S. Pat. No. 3,222,412); coke or coconut shells, elevated temperatures and pore blocking by carbon deposition (U.S. Pat. No. 3,801,513); vinylidene chloride copolymers (U.S. Pat. No. 4,046,709); and bituminous coal or coconut shells, elevated temperatures and an inert atmosphere (U.S. Pat. No. 2,556,859). The preferred substrates are chars of coal and nut shells. Therefore, carbon molecular sieve is distinct from activated carbons, which are not oxygen selective kinetically over nitrogen. However, in contrast, activated carbons are known to have oxygen functionally which would provide some hydrophylic nature. In contrast, after processing as set forth above to produce carbon molecular sieves from carbons, the resulting carbon molecular sieve does not have any significant oxygen functionality which would render it hydrophylic or capable of significant desiccant properties. Therefore, as set forth in the present invention it is necessary when using carbon molecular sieves for basic oxygen/nitrogen adsorptive separations, to alter the carbon molecular sieve and render it hydrophylic for desiccant duty in order for it to have the properties of the present invention with characteristics of both oxygen selectivity and desiccant capability for water entrained in the feed gas to be separated into oxygen and nitrogen.

The alteration of carbon molecular sieves to make them hydrophylic is performed in one instance in the present invention by impregnating hygroscopic salts such as lithium chloride, lithium bromide, calcium chloride, magnesium chloride, calcium nitrate and potassium fluoride or desiccant (dehydrating) agents such as oxides of silicon, aluminum, calcium or barium onto the underlying carbon molecular sieve using an incipient wetness technique which involves the aqueous or other liquid solution or suspension of one of the above agents being poured over the carbon molecular sieve support only sufficient to fill the pores of the carbon molecular sieve without the existence of standing solution or liquid, and then drying the thus wetted and impregnated carbon molecular sieve to drive off the solvent leaving the impregnated agents previously incorporated in the liquid or aqueous solution or suspension. In the incipient wetness technique, in contrast to full flooding of the material to be impregnated, the volume of solvent utilized is roughly equivalent to the pore volume of the materials to be impregnated, which in this case is the carbon molecular sieve. In this way the technique differs from other impregnation or saturation techniques.

The enhancement of the carbon molecular sieves of the present invention when impregnated with the hygroscopic solids or dehydrating agents identified in this disclosure is that the resulting composite desiccant and air separation adsorbent has enhanced properties, which can be measured by air recovery, which is a measure of the nitrogen produced by volume in comparison to the air fed to the separation by volume and also by a measure of productivity, which is the standard cubic feet per hour of nitrogen per cubic foot of adsorbent used in the adsorptive separation to produce the nitrogen product.

A technique to enhance the water adsorption properties of carbon molecular sieves (CMS) is to impregnate the adsorbent with hygroscopic salts. Hygroscopic salts, which include salts like LiCl, LiBr, KF, $MgCl_2$ and $CaCl_2$ are very soluble solids which upon exposure to water form a film of highly saturated solution. By impregnating oxygen selective carbon molecular sieve adsorbents with hygroscopic salts, the water adsorption capacity is increased and the isotherm shape is positively influenced. The water and oxygen adsorption capacities and fractional approach to nitrogen and oxygen adsorption equilibrium of untreated CMS, LaRoche 201 alumina as well as several impregnated samples are shown in Table 1. Most impregnated samples were prepared using an aqueous incipient wetness technique with a weight loading of the salt of 5%. The preparation of the $Ca(NO_3)_2$ material will be described later. After impregnation, the samples were air dried at 120° C. for 16 hours. The results in Table 1 show that (1) impregnation of the CMS with hygroscopic salts increases the water adsorption capacity and changes the water adsorption isotherm at low relative humidity, (2) the impregnated samples show oxygen capacities nearly equal to that of untreated CMS, (3) the LiCl loaded sample display nitrogen and oxygen uptake rates nearly identical to the untreated material, (4) the LiCl loaded sample has a water capacity that exceeds that of a conventional PSA desiccant, LaRoche 201 alumina, and (5) the impregnated samples demonstrate higher oxygen capacity and slower nitrogen uptake (greater oxygen kinetic selectivity) than LaRoche 201. These results show that impregnation of CMS with hygroscopic salts enhances its water adsorption properties and keeps the desired oxygen selectivity properties intact.

TABLE 1

| Adsorption Properties of Treated CMS | | | | |
|---|---|---|---|---|
| Adsorbent | Water Capacity at 20% r.h. | $O_2$ capacity at 30° C., 1 atm (mmole/g) | Fractional $N_2$ uptake at 2 min (30° C.) | Fractional $O_2$ uptake at 2 min (30° C.) |
| CMS (as-received) | 1.0% | 0.33 | 23% | 97% |
| 5% LiCl/CMS | 13.4% | 0.32 | 22% | 96% |
| 5% $CaCl_2$/CMS | 8.2% | 0.28 | 18% | 74% |
| 5% $MgCl_2$/CMS | 7.2% | 0.32 | 10% | 83% |
| 10% $Ca(NO_3)_2$/CMS | 8.0% | 0.30 | 19% | 93% |
| LaRoche 201 alumina | 13.1% | 0.028 | 98% | 99% |

EXAMPLE 1

A 76 gram amount of LiCl was dissolved in 440 ml of distilled water and impregnated on 1470 grams of CMS using an incipient wetness technique. The mixture was then air dried at 120° C. for 2 hours to evaporate the solvent. After cooling to room temperature, the mixed adsorbent was treated with 440 ml of methanol to drive surface LiCl into macropores. The sample was again air dried at 120° C. for 2 hours. The LiCl loading was estimated to be 5 wt %.

Figure 2:
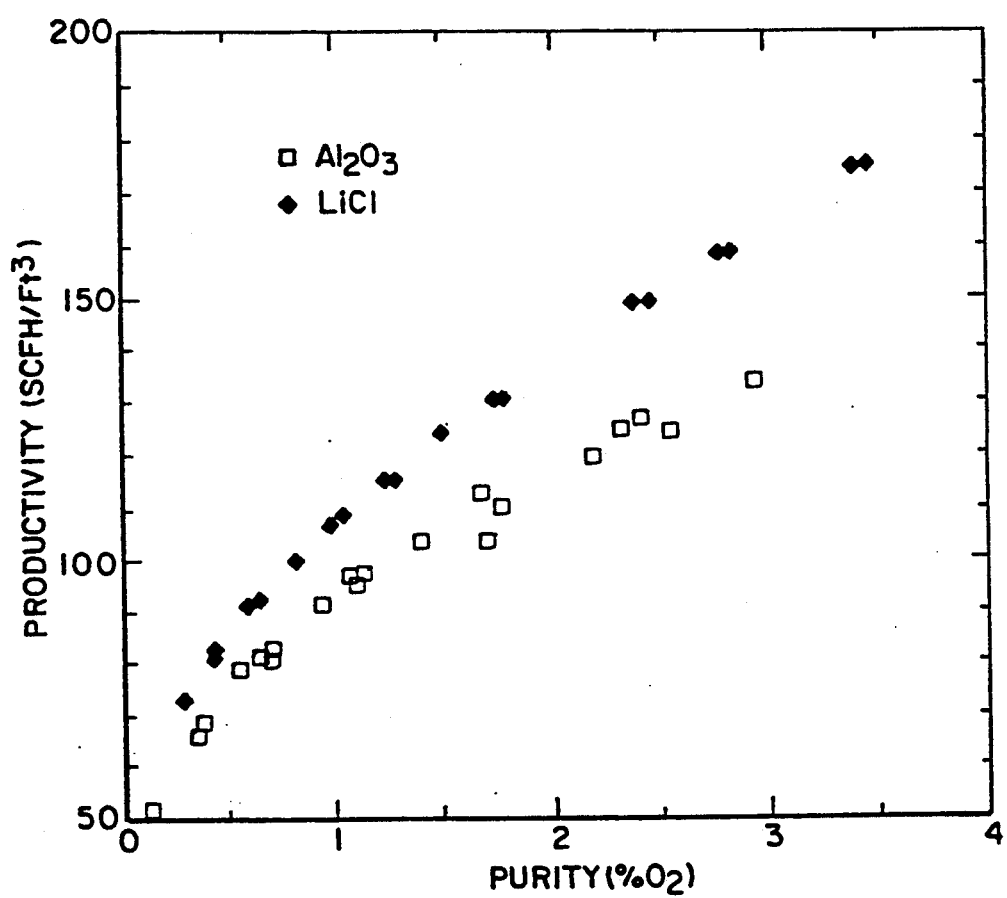
FIG. 2 is a graph of the productivity versus purity of the present invention (LiCl) in comparison to the prior art ($Al_2O_3$) where desiccant is loaded in the upstream portion of an adsorbent bed at 70° F.
Figure 3:
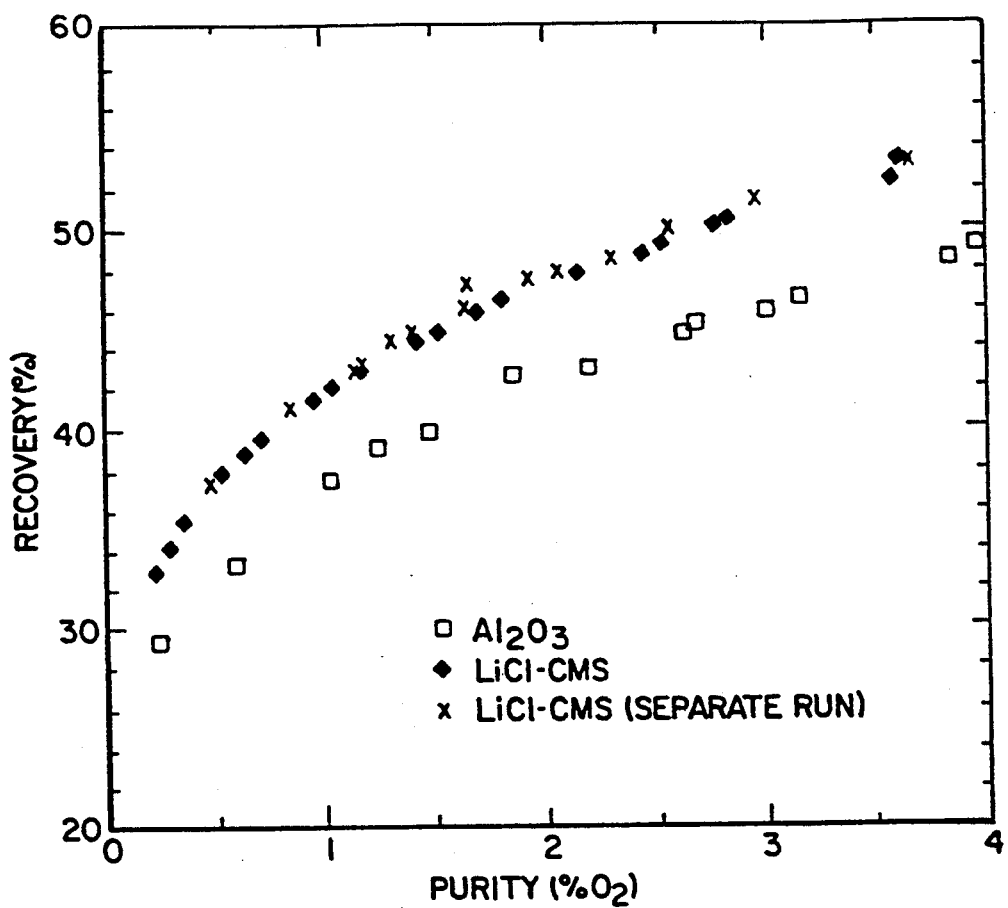
FIG. 3 is a graph of recoveries similar to FIG. 1 but done at a differing temperature of 90° F.
Figure 4:
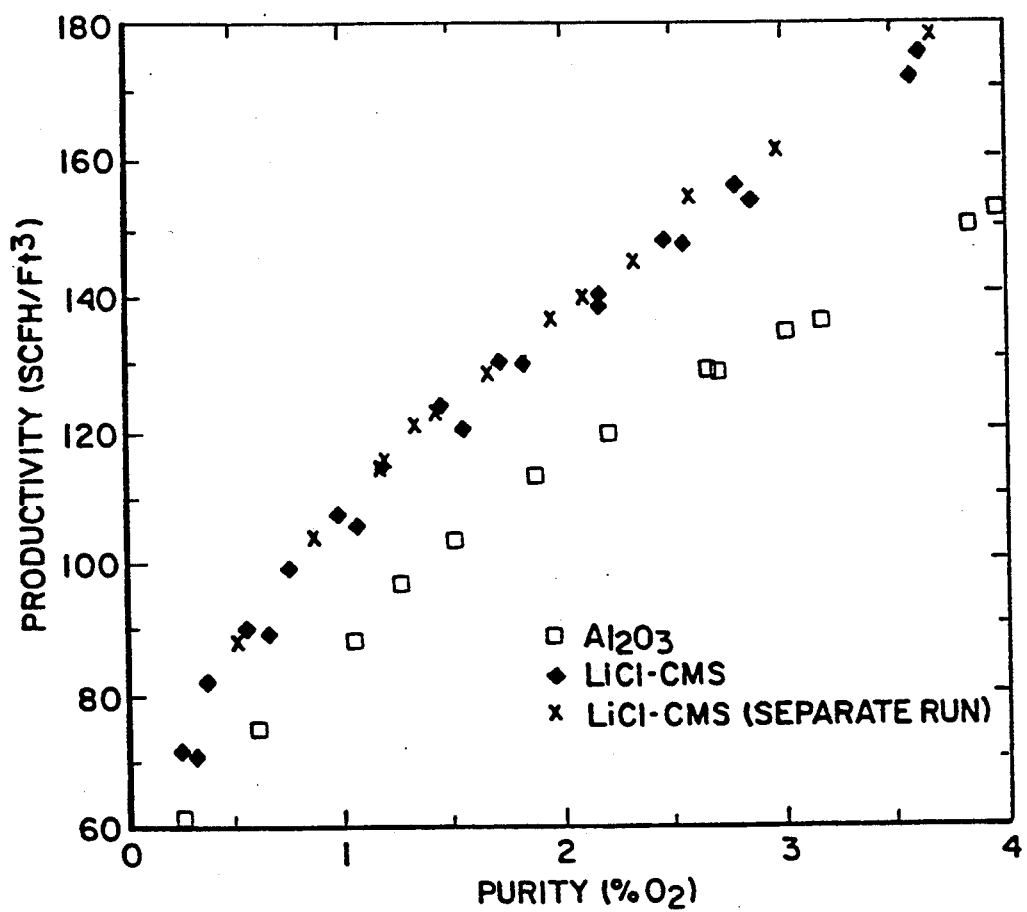
FIG. 4 is a graph of productivities similar to FIG. 2 but again done at differing temperature of 90° F.
Figure 5:
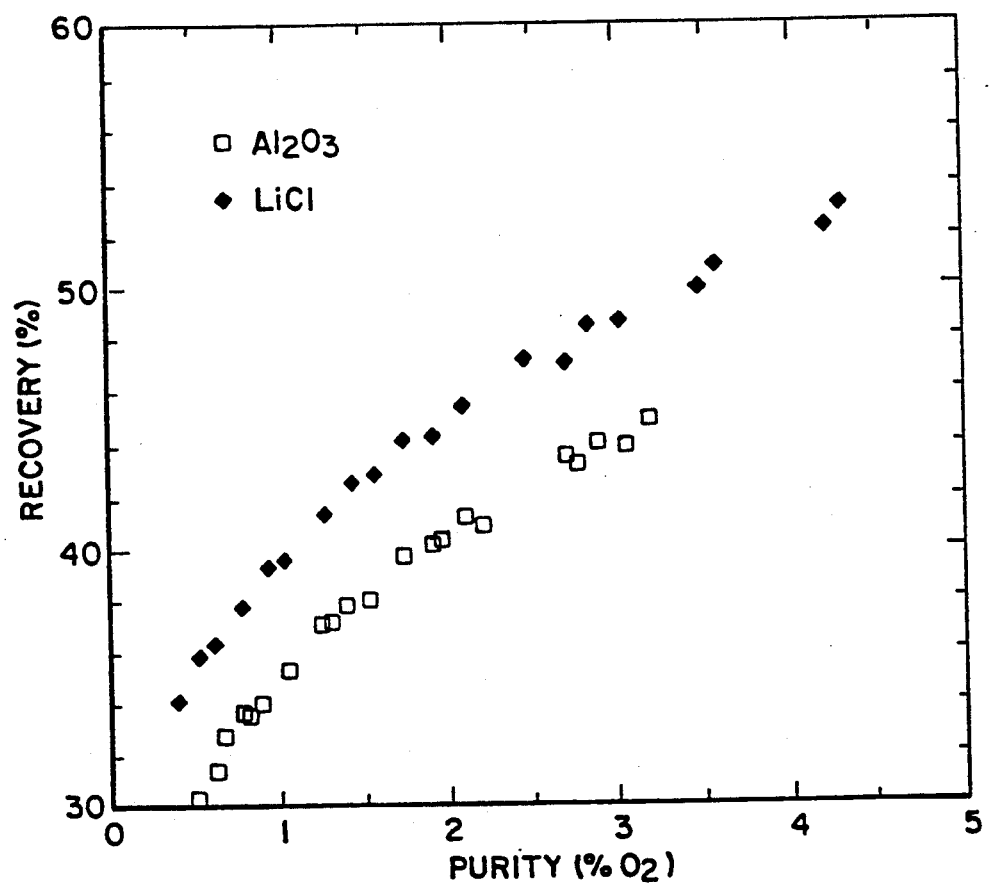
FIG. 5 is a graph of recoveries similar to FIG. 1 for processes done at a third temperature of 110° F.
Figure 6:
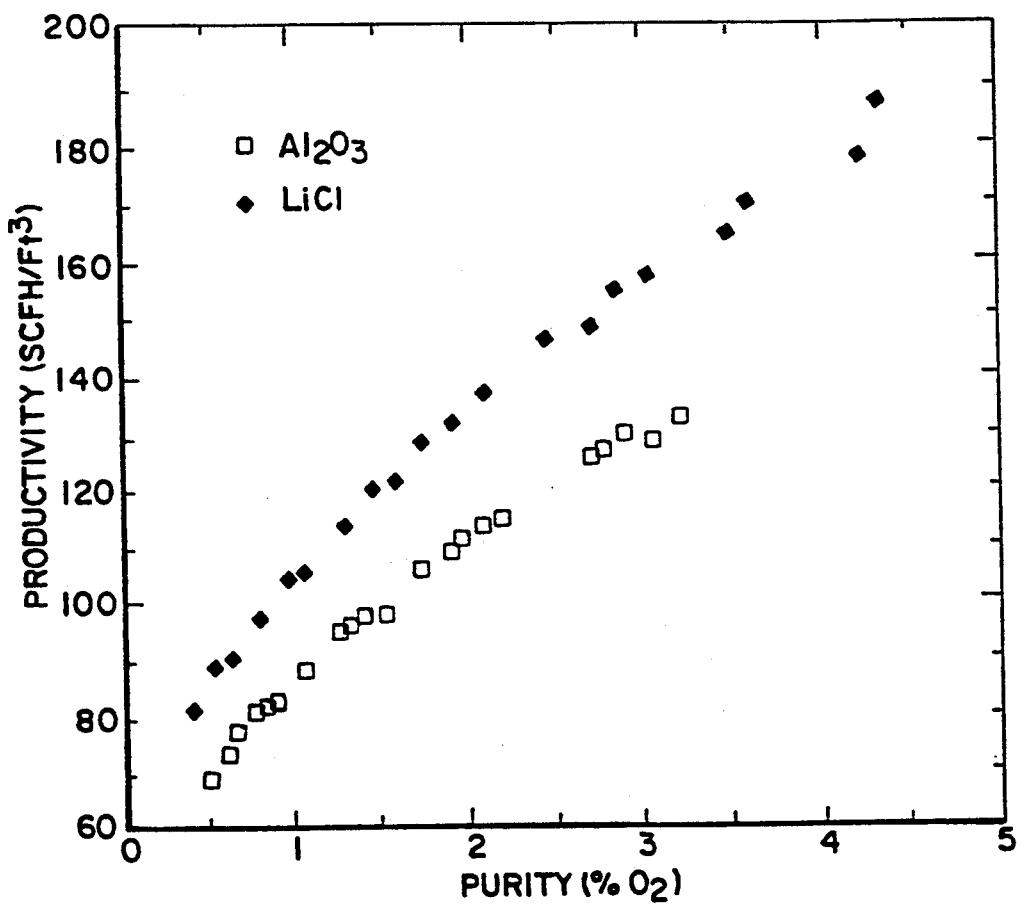
FIG. 6 is a graph of productivities similar to FIG. 2 of the present invention and prior art processes performed at third temperature of 110° F.

Using a pressure swing process set forth in Table 2, FIG. 1 shows air recovery (volume of nitrogen produced over volume of air fed to the process) vs. oxygen concentration in the product at 70° F. At 0.5% oxygen in the product, air recovery was improved by 4 percentage points when state of the art alumina was replaced with LiCl/CMS of the present invention. A 5.2 percentage point improvement were observed at 3% oxygen. FIG. 2 shows that the productivity increase was 17.3% at 0.5% oxygen and 23.3% at 3% oxygen. The productivity is defined as the product flow rate (SCFH) divided by the volume of adsorbent CMS ($Ft^3$).

TABLE 2

| $N_2$ PSA Cycle Steps and Durations |
|---|
| Cycle Step |
| Feed Repressurization |
| Adsorption |
| Idle |
| Dual-End Pressure Equilization |
| Idle |
| Depressurization |
| Idle |
| Dual-End Pressure Equilization |
| Idle |

A 5 to 5.5 percentage point improvement was observed for recovery at 90 and 110° F., and 20 to 28% improvement in productivity was noted under the same operating conditions (FIGS. 3 to 6). The PSA performance at 0.5 and 3% oxygen is summarized in Table 3 where the state of the art desiccant $Al_2O_3$ and a composite desiccant of the present invention, LiCl on CMS, were respectively used as a first stage or zone of an adsorptive bed predominantly filled with a non-desiccant oxygen selective adsorbent in an air-fed pressure swing adsorption separation for product nitrogen.

TABLE 3

| Comparison of Process Performance Using $Al_2O_3$ and LiCl—CMS | | | | | | | |
|---|---|---|---|---|---|---|---|
| $O_2$ level % | Temperature °F. | Recovery ($Al_2O_3$), % | Recovery (LiCl), % | Recovery Improvement, % Points | Productivity ($Al_2O_3$), SCFH/$ft^3$ | Productivity (LiCl), SCFH/$ft^3$ | Productivity Improvement, % |
| 0.5 | 70 | 34.8 | 38.8 | 4.0 | 75 | 88 | 17.3 |
| 0.5 | 90 | 32.2 | 37.2 | 5 | 72 | 87 | 20.8 |
| 0.5 | 110 | 30.3 | 35.5 | 5.2 | 68 | 87 | 27.9 |
| 3 | 70 | 48 | 53.2 | 5.2 | 133 | 164 | 23.3 |
| 3 | 90 | 46 | 51.4 | 5.4 | 134 | 161 | 20.2 |
| 3 | 110 | 44 | 48.9 | 4.9 | 129 | 156 | 20.9 |

The utility of hygroscopic salt impregnated CMS was tested in an $N_2$ process development unit (PDU) which is a pilot plant scale adsorption system. The $N_2$ PDU consists of two adsorption beds 6 feet in length from which process design data are obtained. In standard experiments, the beds are loaded with one foot of alumina (LaRoche 201) at the feed end of the bed followed by 5 feet of CMS. In the LiCl adsorbent case, the alumina section was replaced by 5% LiCl/CMS. The cycle steps and durations are summarized in Table 2 above. $N_2$ productivity and air recovery were measured at 70, 90 and 110° F. at an adsorption pressure of 110 psig. Additionally, the $N_2$ PDU was run to test a desiccant CMS produced using the exact preparation procedure described above, only switching to $MgCl_2$ in place of the LiCl of Example 1. The cycle and testing procedure was the same as that described above. Table 4 compares performance data of the LiCl and $MgCl_2$ loaded adsorbents. As in the case of the LiCl based adsorbent, the $MgCl_2$ based adsorbent improves the process performance over alumina. However, the improvement is less than that noted with LiCl. Table 1 shows that the MgCl$_2$ based adsorbent has a lower water capacity and slower gas uptake rates. However, MgCl$_2$ has better in-use life span in comparison to LiCl. This shows that the best adsorbents for this application will display (1) high water adsorption capacity, particularly at low relative humidity and (2) gas uptake rates nearly identical to the untreated CMS. The high water capacity at low relative humidity sharpens the water mass transfer zone and thereby helps contain the water zone in the pretreatment section. In the case of gas uptake rate, if gas uptake rates are slowed down, the oxygen mass transfer zone gets smeared which hurts process performance, particularly at high nitrogen purities.

TABLE 4

Comparison of Process Performance on Modified CMS
(99.5% Purity, 70° F., 106 psig Adsorption Pressure)

| Desiccant Material | Recovery % | Recovery Improvement (% points) | Productivity (SCFH/ft$^3$) | Productivity Improvement (%) |
|---|---|---|---|---|
| Alumina | 34.8 | 0 | 75 | 0 |
| LiCl/CMS | 38.8 | 4.0 | 88 | 17.3 |
| MgCl$_2$/CMS | 35.7 | 0.9 | 78 | 4.3 |

Thus, impregnation of CMS with hygroscopic salts is a viable technique to produce oxygen selective desiccants which are capable of improving nitrogen PSA performance. The hygroscopic salt should (1) increase water capacity significantly at low relative humidity and (2) should minimally effect gas uptake rates.

Various metal oxides are very good dehydrating agents, including; silica alumina, CaO and BaO. By incorporating metal oxides into CMS structure, oxygen selective desiccants can be produced. Two techniques for the production of metal oxide/CMS include (1) impregnation of CMS with inorganic salts like nitrates, acetate and formates followed by thermal decomposition of the anion to form the corresponding metal oxide and (2) direct impregnation of CMS with metal oxides in the form of inorganic sols.

Figure 7:
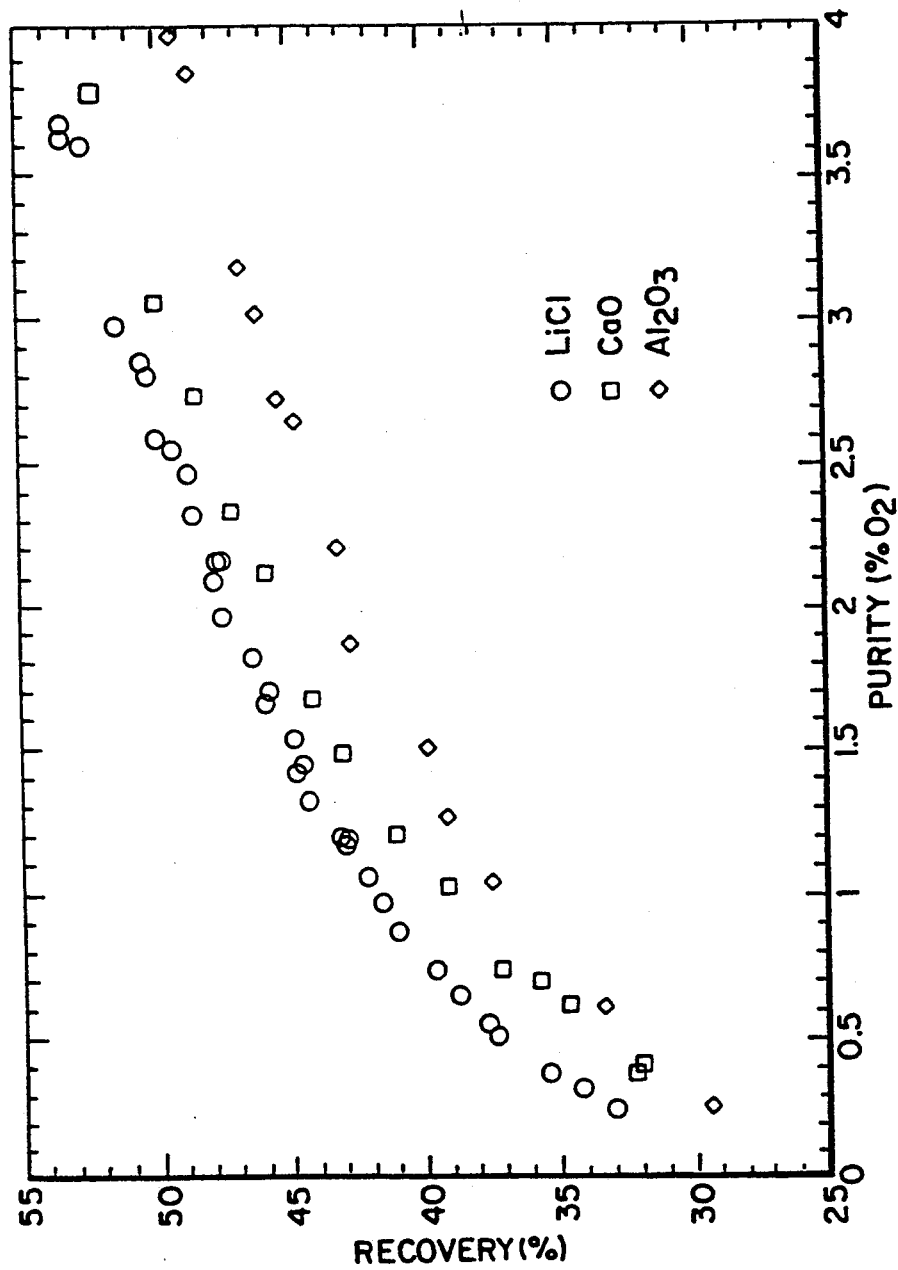
FIG. 7 is a graph of air recovery of several embodiments (LiCl, CaO) of the present invention in contrast to the prior art ($Al_2O_3$) conducted at 90° F.

PDU experiments were carried out as previously described with metal oxide loaded CMS in place of alumina. The results obtained with CaO/CMS are shown in FIG. 7. The sample of CaO/CMS was prepared by dissolving 152 grams of Ca(NO$_3$)$_2$ in 440 ml of distilled water and impregnating on 1470 grams of CMS using an incipient wetness technique. The mixture was then air dried at 120° C. for 2 hours to evaporate the solvent. The nitrate anion was then decomposed by heating the mixture to 150° C. in nitrogen for 6 hours. The sample was then cooled to room temperature in nitrogen. FIG. 7 shows that CaO/CMS improves process performance over the standard alumina case, but the performance falls short of the LiCl/CMS material.

EXAMPLE 3

PDU experiments were also carried out with a SiO$_2$ sol impregnated CMS. The material was produced by impregnation of CMS with Nalco 2327 silica sol (a colloidal suspension of silica in a liquid carrier or dispersant) which has an average particle size of 20 nm. The impregnation was carried out as follows. The carbon and sol were connected through a manifold, yet isolated with valves. The CMS and the sol were evacuated to 0.01 and 1 torr, respectively. The sol was then added to the carbon while still under vacuum and the mixture was allowed to sit for 15 minutes before returning to atmospheric pressure. The mixture was then air dried at 110° C. for 10 hours. The Si loading was 6 wt %.

Figure 8:
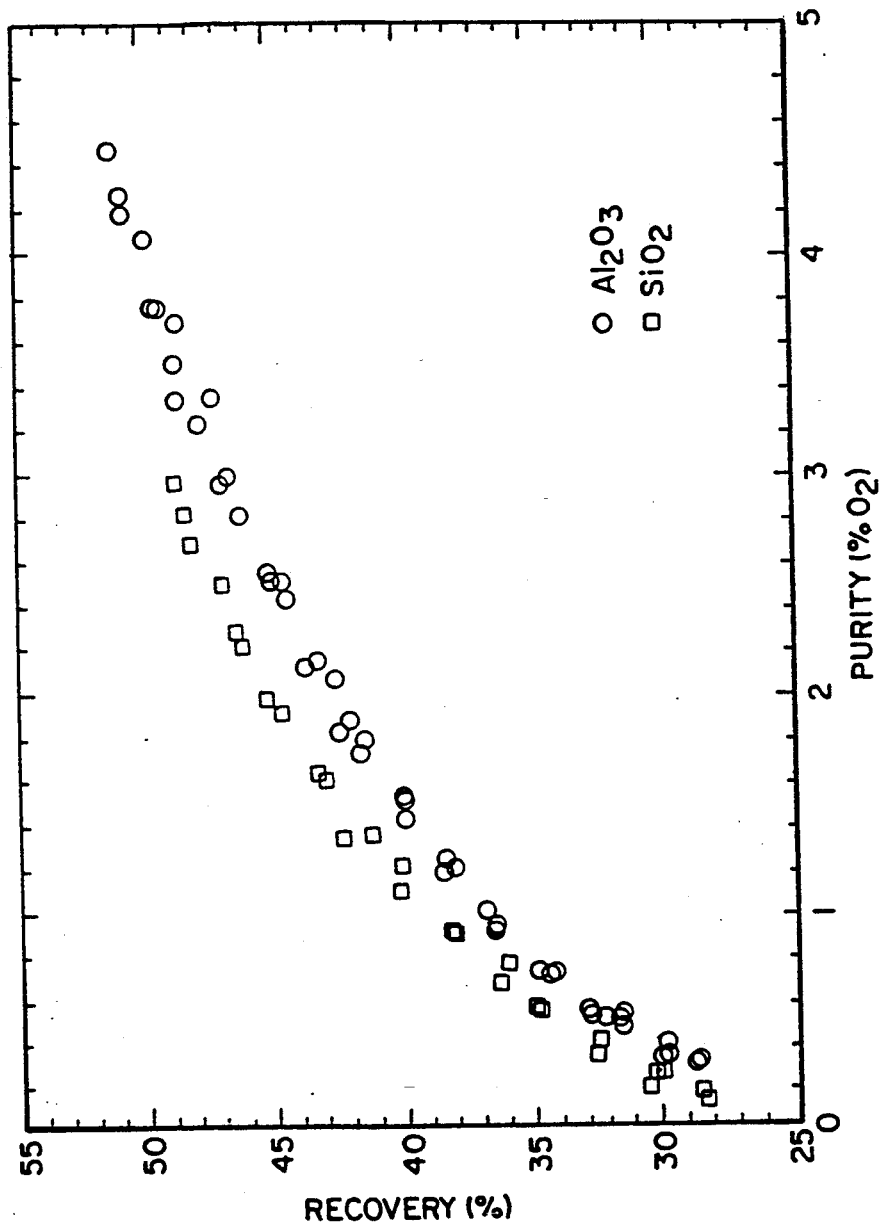
FIG. 8 is a graph of air recoveries for a process of the present invention using silicon dioxide impregnated carbon molecular sieve and the prior art using alumina at 70° F.
Figure 9:
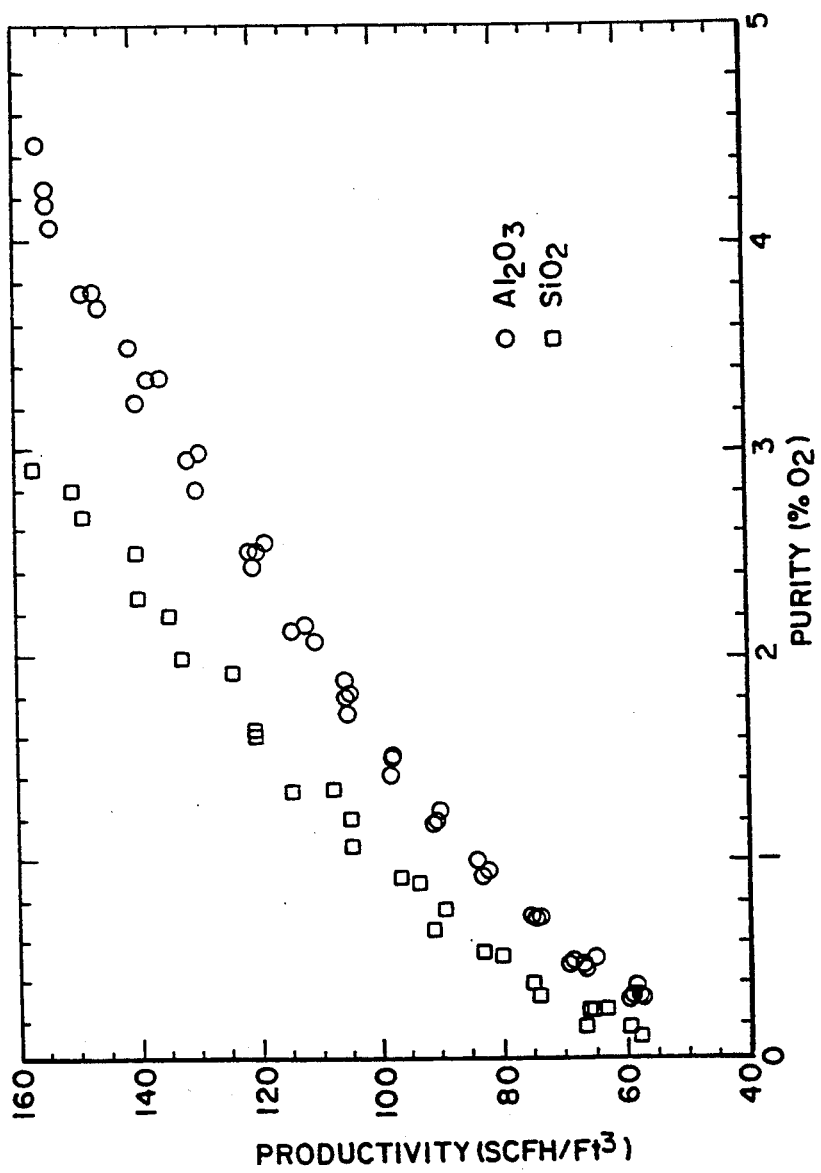
FIG. 9 is a graph of productivity of nitrogen contrasting the present invention as represented by silicon dioxide impregnated carbon molecular sieve and alumina at 70° F.

The PDU results obtained with the SiO$_2$/CMS are shown in FIGS. 8 and 9. Again, the process conditions were identical to those previously described. FIG. 8 shows that the SiO$_2$/CMS improves the air recovery about 2 percentage points over the entire purity range, while the increase in nitrogen productivity is about 15% (FIG. 9). Clearly, impregnation of CMS with inorganic metal oxides provides a route to O$_2$ selective desiccants which improve the performance of the N$_2$ PSA process.

It is also proposed that by oxidation of the surface of CMS, oxygen selective desiccants can be produced. It is well known that oxidation of a hydrophobic carbon surface can greatly enhance its water adsorption properties, such as in U.S. Pat. No. 4,702,749, which is incorporated by reference herein in its entirety. The oxidation can be carried out (1) in the gas phase with oxidants like O$_2$, NO$_2$ and O$_3$, (2) in the liquid phase with oxidants like HNO$_3$ and H$_2$O$_2$ or (3) in a plasma. The oxidation places oxygen functional groups (ketone, acid, etc.) on the carbon surface which act as water nucleation sites thereby enhancing the water adsorption properties while leaving the oxygen selectivity unchanged.

As described above, the problem facing the nitrogen-enriched gas product producing industry using pressure swing adsorption is to develop a more efficient desiccant material. An adsorbent of this type in accordance with the present invention would display the dual function of (1) gas drying and (2) selective oxygen adsorption over nitrogen. The results in Table 1 above clearly show that impregnation of CMS with hygroscopic salts and metal oxides improves the water adsorption properties of the material. Table 1 also shows that these materials demonstrate kinetic selectivity for oxygen over nitrogen. Thus, both materials requirements, desiccant properties and oxygen selectivity, are met by the current adsorbents.

The process development unit results given above clearly show that these oxygen selective desiccants improved results over conventional desiccants like alumina. The process improvements are measured by increases in air recovery and nitrogen productivity. In general, increasing the air recovery reduces the power requirements of the process, while increasing productivity reduces bed sizes and plant capital cost. The desiccant CMS materials increase air recovery relative to the alumina case because in the final depressurization step where all the recovery losses occur, the desiccant CMS adsorbents desorb an oxygen enhanced gas stream while alumina, which has no selectivity, desorbs air. Therefore, the improved recovery obtained with the current adsorbents over conventional desiccants is due to their kinetic oxygen selectivity over nitrogen. The current adsorbents also improve the nitrogen productivity of the process. Clearly, these adsorbents can process more air and thereby produce more nitrogen because of their greater oxygen adsorption capacity than conventional desiccants. In summary, these materials perform well because of (1) their water adsorption properties, (2) their kinetic oxygen selectivity and (3) their high oxygen adsorption capacity.

Although not wanting to be held to any specific theory for operability, it is none-the-less believed that the principle reason why the dual adsorbent works is as follows. The CMS precursor has a bimodal pore distribution. There is significant pore volume at a pore size of greater than 500 nm (macropores) and 2-5 nm (mesopores), as well as significant pore volume with pores below 0.4 nm (micropores). In addition to the bimodal pore distribution, the adsorption of water and oxygen involves different mechanisms. The adsorption of water is dominated by its ability to form hydrogen bonds with fluorine, oxygen and nitrogen, while the adsorption of oxygen is influenced mostly by pore size. Thus, the unique situation exists where the two gases being adsorbed have different mechanisms of adsorption and the adsorbent has a bimodal pore size distribution. This allows for water adsorption to occur on water adsorbing sites in the macropores, while leaving the micropores unobstructed for oxygen adsorption. Therefore, a dual adsorbent is produced because (1) the bimodal pore distribution and (2) the different adsorption mechanisms allow water and oxygen adsorption to occur independently and simultaneously on the adsorbent. Carbon dioxide can also be adsorbed in the same micropores as oxygen is adsorbed because carbon dioxide has a molecular size less than oxygen and therefore levels itself to kinetic uptake just as does oxygen. Therefore, the composition of the present invention can remove water and carbon dioxide that is present in air during the adsorptive separation of oxygen from nitrogen.

The present invention has been set forth with reference to several specific embodiments, however the full scope of the invention should be ascertained from the claims which follow.

We claim:

1. A process of adsorptive separation of nitrogen from oxygen using an adsorbent kinetically selective for the adsorption of oxygen over nitrogen in which at least an initial portion of the adsorbent is a composite oxygen and carbon dioxide selective desiccant comprising a carbon molecular sieve which is kinetically selective for the adsorption of oxygen over nitrogen and an agent for the sorption of water.

2. The process of claim 1 wherein all of the adsorbent is a carbon molecular sieve.

3. The process of claim 1 wherein the separation is a pressure swing process.

4. The process of claim 3 wherein the pressure swing separation is performed in a plurality of zones of adsorbent in which in each zone is conducted a series of steps comprising; adsorption at elevated pressure, pressure equalization between zones, desorption of the zone finishing adsorption, pressure equalization between zones, repressurization of the zone finishing desorption.

5. The process of claim 4 wherein after said desorption step, a low pressure rinse of nitrogen is performed on the zone finishing desorption.

6. The process of claim 1 wherein the separation is a vacuum swing process.

7. The process of claim 1 wherein the separation is a temperature swing process.

8. The process of claim 1 wherein said agent is selected from the group consisting of lithium chloride, lithium bromide, calcium chloride, magnesium chloride, calcium nitrate, potassium fluoride, oxides of silicon, aluminum, calcium and barium and mixtures thereof.

9. The process of claim 1 wherein said agent is present in the meso- and macropores of said carbon molecular sieve.

10. The process of claim 1 wherein said agent is lithium chloride.

11. The process of claim 1 wherein said agent is magnesium chloride.

12. The process of claim 1 wherein said agent is a sol of an oxide of silicon.

13. A process of adsorptive separation of nitrogen from oxygen using an adsorbent kinetically selective to the adsorption of oxygen over nitrogen in which an at least initial portion of the adsorbent is a composite oxygen selective desiccant comprising a carbon molecular sieve which is kinetically selective for the adsorption of oxygen over nitrogen and contains oxygen functional groups which are hydrophilic.

14. A composite oxygen selective desiccant comprising a carbon molecular sieve which is kinetically selective for the adsorption of oxygen over nitrogen and an agent for the sorption of water.

15. The composite of claim 14 wherein said agent is selected from the group consisting of lithium chloride, lithium bromide, calcium chloride, magnesium chloride, calcium nitrate, potassium fluoride, oxides of silicon, aluminum, calcium and barium and mixtures thereof.

16. The composite of claim 14 wherein said agent is present in the meso- and/or macropores of said carbon molecular sieve.

17. The composite of claim 14 wherein said agent is lithium chloride.

18. The composite of claim 14 wherein said agent is magnesium chloride.

19. The composite of claim 14 wherein said agent is silica.

20. The composite of claim 14 wherein said carbon molecular sieve is a product of a material selected from the group consisting of chars of coconut shell organic polymers, coal, peach pits, cherry pits, babassu nutshells or mixtures thereof.

21. The composite of claim 14 wherein said agent is impregnated on said carbon molecular sieve in a liquid media using the incipient wetness technique.

22. A composite oxygen and carbon dioxide selective desiccant comprising a carbon molecular sieve having meso- and/or macropores predominantly in the size range of approximately greater than 2 nanometers and micropores predominantly in the size below approximately 0.4 nanometers and a desiccant agent, impregnated substantially in the meso- and macropores of said sieve, selected from the group consisting of lithium chloride, lithium bromide, calcium chloride, magnesium chloride, calcium nitrate, potassium fluoride, oxides of silicon, aluminum, calcium and barium and mixtures thereof.

23. A process for making an oxygen selective desiccant comprising impregnating a carbon molecular sieve with a solution or suspension of an agent or its precursor for the sorption of water using the incipient wetness technique and drying the resulting composite desiccant.

24. The process of claim 23 wherein the agent is selected from the group consisting of lithium chloride, lithium bromide, calcium chloride, magnesium chloride, calcium nitrate, potassium fluoride, oxides of silicon, aluminum, calcium and barium and mixtures thereof.

25. The process of claim 23 wherein a precursor of the agent is impregnated on the carbon molecular sieve and the composite is heated at elevated temperature to decompose the precursor to the agent for sorption of water.

26. The process of claim 25 wherein the precursor is selected from the group consisting of cations of silicon, aluminum, calcium and barium with anions of nitrates, acetates, formates, or hydroxides.

27. The process of claim 25 wherein the precursor is selected from the group consisting of silica containing sols and gels.

28. A process of making an oxygen selective desiccant comprising oxidizing a carbon molecular sieve which is kinetically selective for the adsorption of oxygen over nitrogen in the presence of an oxidizing agent to produce oxygen functional groups which are selective to water.

29. The process of claim 28 in which the oxidation is conducted in the gas phase with an oxidizing agent selected from the group consisting of oxygen, nitrogen dioxide and ozone.

30. The process of claim 28 in which the oxidation is conducted in the liquid phase with an oxidizing agent selected from the group consisting of nitric acid and hydrogen peroxide.

* * * * *